US008966236B2

(12) United States Patent
Funk et al.

(10) Patent No.: US 8,966,236 B2
(45) Date of Patent: Feb. 24, 2015

(54) DYNAMICALLY REDIRECTING BOOT TO ANOTHER OPERATING SYSTEM

(75) Inventors: Troy Alan Funk, Issaquah, WA (US); Shon T. Eizenhoefer, Bothell, WA (US); Ping Xie, Redmond, WA (US); Sanket Patel, Redmond, WA (US); Itai Rosenberger, Seattle, WA (US); Arvind R. Padole, Bothell, WA (US); Ellsworth D. Walker, Seattle, WA (US); James A. Schwartz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 569 days.

(21) Appl. No.: 13/101,897

(22) Filed: May 5, 2011

(65) Prior Publication Data

US 2012/0284494 A1    Nov. 8, 2012

(51) Int. Cl.
  *G06F 9/00*    (2006.01)
  *G06F 9/44*    (2006.01)

(52) U.S. Cl.
  CPC ............ *G06F 9/4401* (2013.01); *G06F 9/4408* (2013.01)
  USPC .................................. 713/2; 713/100; 714/36

(58) Field of Classification Search
  USPC ......................................... 713/2, 100; 714/36
  See application file for complete search history.

(56) References Cited

U.S. PATENT DOCUMENTS

| | | | |
|---|---|---|---|
| 6,415,382 B1 | 7/2002 | Kwan | |
| 6,993,649 B2 | 1/2006 | Hensley | |
| 7,080,245 B2 * | 7/2006 | Ballard et al. | 713/2 |
| 7,418,588 B2 | 8/2008 | Lin et al. | |
| 7,664,836 B2 | 2/2010 | Kim | |
| 2004/0153638 A1 * | 8/2004 | Tseng et al. | 713/1 |
| 2004/0236997 A1 * | 11/2004 | Poo | 714/36 |
| 2008/0162917 A1 | 7/2008 | McAvoy | |
| 2009/0013165 A1 | 1/2009 | Chow et al. | |
| 2009/0158027 A1 * | 6/2009 | Wood et al. | 713/2 |
| 2009/0172384 A1 | 7/2009 | Anson | |
| 2011/0107076 A1 * | 5/2011 | Kim et al. | 713/2 |
| 2011/0113227 A1 * | 5/2011 | Lu et al. | 713/2 |

OTHER PUBLICATIONS

"International Search Report", Mailed Date: May 7, 2012, Application No. PCT/US2011/055640, Filed Date: Oct. 10, 2011, pp. 9.

"Boot and Run Linux from a USB Flash Memory Stick", Retrieved at <<http://www.pendrivelinux.com/>>, Retrieved Date: Mar. 10, 2011, pp. 2.

(Continued)

*Primary Examiner* — M Elamin
(74) *Attorney, Agent, or Firm* — Timothy Churna; Kate Drakos; Micky Minhas

(57) ABSTRACT

Various embodiments provide an ability to automatically boot a computing device with an operating system stored on a portable storage device when the portable storage device is detected to be present. The computing device can be configured to dynamically boot from the portable storage device when the portable storage device is detected, and revert to a programmed boot order in its associated boot module when the portable storage device is not detected. In some embodiments, the operating system is fully encapsulated on the portable storage device, such as the operating system being completely separate from an operating system initially booting the computing device.

17 Claims, 6 Drawing Sheets

(56) References Cited

OTHER PUBLICATIONS

"XP on 8 GB Flash Drive", Retrieved at <<http://forums.techguy.org/windows-xp/802261-please-help-xp-8gb-flash.html>>, Retrieved Date: Mar. 10, 2011, pp. 3.

"How to Boot from your USB External Hard Drive", Retrieved at <<http://www.hard-drive-help.com/boot-usb-external-hard-drive.html>>, Retrieved Date: Mar. 10, 2011, pp. 2.

* cited by examiner

US 8,966,236 B2

DYNAMICALLY REDIRECTING BOOT TO ANOTHER OPERATING SYSTEM

BACKGROUND

Computing devices today typically use operating systems as a fundamental way to control interaction with their associated hardware, as well as to provide applications with simplified access to resources. For instance, an operating system can be used to manage memory allocation, manage hardware input/output, allocate processor utilization, provide services, applications, and other forms of access. Software applications rely upon features supplied and/or managed by the operating system in order for the applications to work. As a consequence, applications written for one operating system may not run on a second operating system without modifications. Furthermore, vendors of the applications may choose not to support multiple operating systems, thus narrowing a user to certain operating systems should the user choose to run a particular application. In some cases, the user may switch between operating systems in order to switch between applications.

To accommodate multiple operating systems, computing devices can be configured to boot more than one operating system. For instance, when a computing device is booting, a user can manually intervene and change where the computing device "looks to" for boot and/or operating system information. Oftentimes, different vendors can provide boot code for the computing devices. As a consequence, how the user can enter and change the boot code for each computing device can differ from vendor to vendor, thus compounding what knowledge the user needs to modify how a computing device boots.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide an ability to automatically boot a computing device with an operating system stored on a portable storage device when the portable storage device is detected to be present. In some embodiments, the operating system is fully encapsulated on the portable storage device. Alternately or additionally, the computing device can revert to a programmed boot order, in its associated boot module, when the portable storage device is not detected to be present.

BRIEF DESCRIPTION OF THE DRAWINGS

The same numbers are used throughout the drawings to reference like features.

DETAILED DESCRIPTION

Overview

Various embodiments provide an ability to automatically boot a computing device with an operating system stored on a portable storage device when the portable storage device is detected to be present. The computing device can be configured to dynamically boot from the portable storage device when the portable storage device is detected, and revert to a programmed boot order in its associated boot module when the portable storage device is not detected. In some embodiments, the operating system is fully encapsulated on the portable storage device, such as the operating system being completely separate from an operating system initially booting the computing device.

In the discussion that follows, a section entitled "Operating Environment" is provided and describes one environment in which one or more embodiments can be employed. Following this, a section entitled "LegacyBasic Input/Output System (BIOS) Booting" describes dynamically redirecting booting of a computing device in a legacy booting system in accordance with one or more embodiments. After this, a section entitled "Unified Extensible Firmware Interface (UEFI) Booting" describes dynamically redirecting booting of a computing device supporting UEFI in accordance with one or more embodiments. Last, a section entitled "Example System" describes an example system that can be utilized to implement one or more embodiments.

Having provided an overview of various embodiments that are to be described below, consider now an example operating environment in which one or more embodiments can be implemented.

Operating Environment

Figure 1:
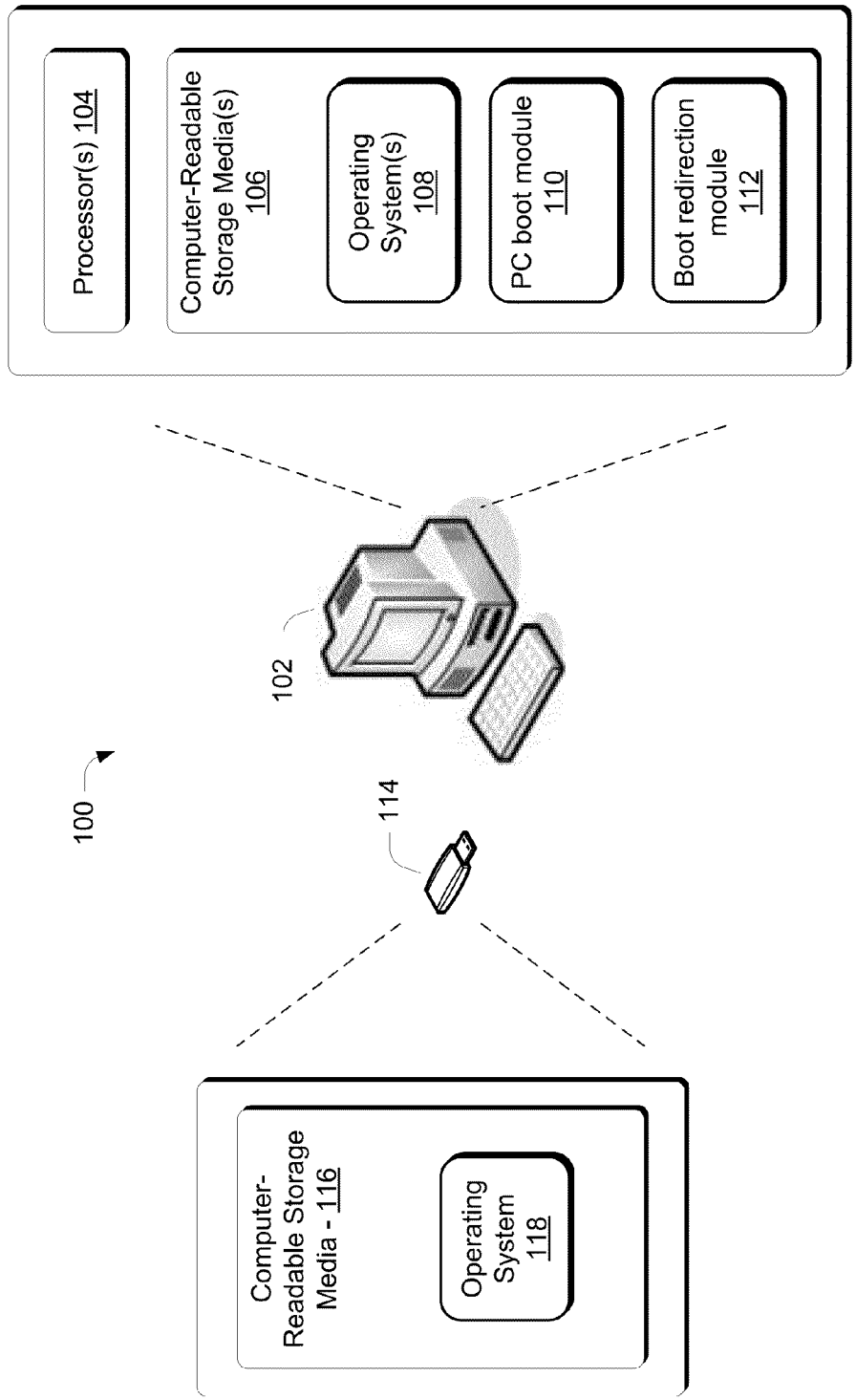
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable storage media 106 and one or more operating system(s) 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 6.

In addition, computing device 102 includes PC boot module 110. PC boot module 110 represents any form of software, hardware, firmware, and/or any combination thereof, configured to enable booting of computing device 102 and/or loading of an associated operating system, such as operating system(s) 108. In some embodiments, PC boot module 110 can comprise various forms of platform firmware configured to enable booting of a computing device, such as Basic Input/Output System (BIOS) code, Unified Extensible Firmware Interface (UEFI) accessible firmware code, and the like. Alternately or additionally, PC boot module 110 can be configured to enable a linear boot order of computing device 102, as further described below.

Computing device 102 also includes boot redirection module 112. Boot redirection module 112 represents software, hardware, firmware, and/or any combination thereof, configured to detect the presence of a portable storage device that is connected to computing device 102, such as portable storage device 114. The portable storage device can be connected to computing device 102 in any suitable way, such as through a cable, directly plugging into the computing device, wirelessly connecting, and the like. Boot redirection module 112 can be further configured to enable dynamically redirecting booting of computing device 102 to an operating system residing on the portable storage device, as further described below. While boot redirection module 112 is illustrated as a single module, it is to be appreciated and understood that it can be implemented as one module, separate modules, or any combination thereof.

Portable storage device 114 is illustrated, in the FIG. 1 example, as a Universal Serial Bus (USB) memory storage device. It is to be appreciated and understood, however, any suitable portable storage device can be used without departing from the spirit of the claimed subject matter, examples of which are provided below. Portable storage device 114 can be configured to attach to, detach from, and/or enable data exchange with computing device 102.

Portable storage device 114 includes computer-readable storage media 116. Computer-readable storage media 116 can include, by way of example and not limitation, all forms of volatile and non-volatile memory and/or storage media that are typically associated with a computing device, examples of which are provided above. Computer-readable storage media 116 includes operating system 118, which can be the same as, or different from operating system 108 included on computing device 102.

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion of dynamically redirecting how a computing device boots using legacy boot code, in accordance with one or more embodiments.

Legacy Basic Input/Output System (BIOS) Booting

Computers today can be manually configured to run applications off several types of storage devices, such as a storage device containing an operating system. For example, if a user is knowledgeable of how to access and modify a computer's BIOS configuration and/or setup, the user can manually reprogram the order of which storage devices a computer looks to for operating systems to boot. In this particular scenario, the computer retains a linear order of which storage devices it looks to boot from, such as always searching a CD ROM drive first and then hard disk second. In some embodiments, the linear order can indicate a relative priority for each boot device. Until the BIOS is reprogrammed and/or modified, the linear boot order of the computer remains the same. Without knowledge of how to access the associated BIOS setup, the user remains unable to modify the boot order of the computer and, to some degree, what operating system the computer might boot, without installing new operating systems on the computer.

Various embodiments provide an ability to automatically boot a computing device with an operating system stored on a portable storage device when the portable storage device is detected to be present. For example, a USB memory device containing a bootable operating system can be attached to the computing device. The computing device can be configured to determine that the portable storage device is present (such as determining the portable storage device is connected to the computing device), recognize the bootable operating system contained upon the portable storage device, and dynamically redirect its booting order to the portable storage device. Any suitable portable storage device can be used, such as a portable CD ROM device, a portable memory flash card, an external hard disk, a USB memory storage device, and the like. In some embodiments, the operating system stored on the portable storage device can be fully encapsulated on the portable storage device. For instance, the operating system contained on the portable storage device can be completely separate and/or independent from any operating system internal to computing device.

Dynamically booting from a portable storage device enables the computing device to boot from the portable storage device when it is detected, and boot in its programmed linear order when the portable storage device is not detected. For instance, when the portable storage device is not detected, the computing device can boot in the order programmed in its associated boot module, such as starting at storage device "A", then storage device "B", and so on. However, upon detecting the presence of the portable storage device, the computing device can deviate from what is programmed in its boot module and boot from the portable storage device. This can be achieved without manual intervention from a user, e.g., without having the user manually modify the computing device's boot code. The portable storage device can differ from the storage devices specified in the computing device's linear boot order. For instance, the portable storage device can be a different type of storage device than storage devices "A" and "B" as described in the example above.

In some embodiments, dynamically redirecting booting to a portable storage device can be selectively enabled and disabled. For example, some operating systems or devices can include software and/or application(s) that allow a user to enable and/or disable dynamic redirection of booting. In some embodiments, the dynamic redirection booting functionality can have a default value of "enabled", while in other embodiments, this functionality can have a default value of "disabled". When dynamic boot redirection is enabled, the computing device can dynamically redirect booting to the portable storage device upon detection of the portable storage device being present. When dynamic boot redirection is disabled, the computing device boots as programmed in its associated boot module, independent of the portable storage device being detected as present or not.

In some cases, the enable/disable software and/or application(s) can be generally accessible by all users, while in other cases, the software can be restricted to users having specified privileges.

In operation, the dynamic boot functionality can be implemented, in one or more embodiments, as follows. Initially, a file can be generated and/or modified to include information reflecting the state of dynamic boot redirection of a corresponding computing device, such as whether dynamic redirection of booting is enabled and/or disabled. The file can be configured in any suitable way, such as a secure file, a text file, a binary file, an openly accessible file, or any combination thereof. In some embodiments, the dynamic boot functionality can be provided in a form other than a file, e.g., in a configuration setting, in a partition table, metadata, and the like. Alternately or additionally, an additional file, such as a trigger file, can be generated and/or configured to direct the computing device to the file(s) containing enable/disable information. In some embodiments, the trigger file can be generated and/or updated dynamically through a user accessing an application to enable dynamic boot redirection of the corresponding computing device. In other embodiments, the trigger file can be installed during installation of an internal operating system on the computing device.

Figure 2:
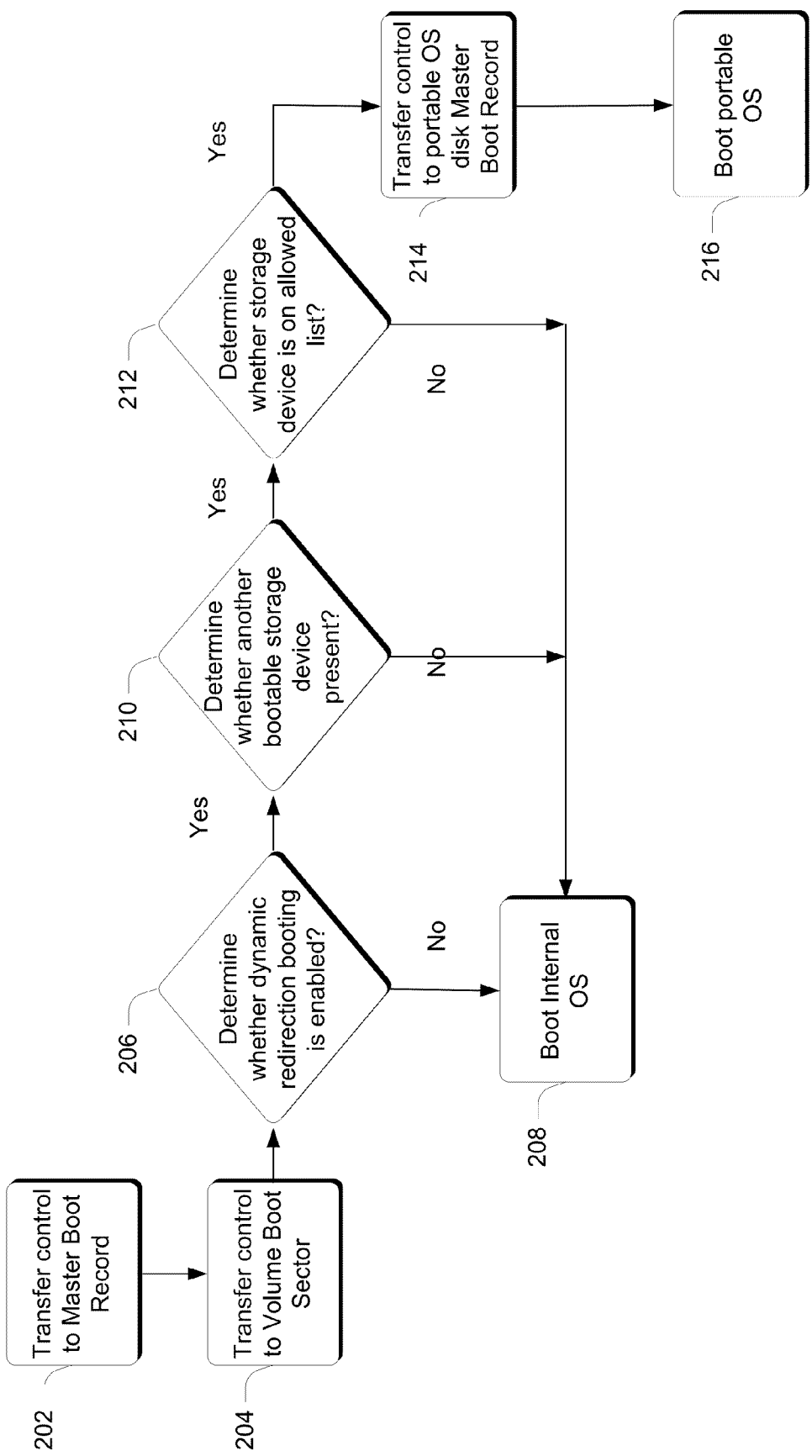
FIG. 2 is a flow diagram that describes steps in a method in accordance with one or more embodiments.

For example, consider FIG. 2, which illustrates a flow diagram that describes steps in a method in accordance with one or more embodiments. In particular, FIG. 2 illustrates one example of dynamically redirecting booting of a computing device that utilizes a modified legacy boot process.

In a legacy booting environment, a computing device can use firmware, such as a BIOS, at power up to initialize and identify various devices associated with the computing device. Typically, a user can modify how the BIOS is configured by exercising vendor defined keystrokes to access the BIOS setup. Responsive to the BIOS completing its portion of initialization of the computing device, step 202 transfers control to a master boot record. The master boot record can be stored on any type of a storage device. More typically, the master boot record is stored on a storage device supported and/or recognized by the BIOS. Oftentimes, the master boot record is the first sector of a partitioned storage device, and includes more detailed information utilized by the computing device to activate one or more applications, such as an operating system. The master boot record can also include information that describes how a disk is partitioned, such as by containing a partition table.

Step 204 transfers to a volume boot sector. The volume boot sector can include additional software and/or applications that can be invoked indirectly by the master boot record. In some embodiments, the volume boot sector can include portions and/or all of boot redirection module 112 of FIG. 1.

Step 206 determines whether dynamic redirection booting is enabled. This can be achieved in any suitable way, such as based upon a setting of a flag, the presence of a trigger file, information extracted from a file, and the like. For example, in some embodiments, the computing device can first determine if the trigger file is present and, if the trigger file is present, process a second file for information indicating the state of the dynamic boot redirecting functionality, as discussed above (e.g. enabled/disabled). If dynamic redirection booting is determined to be not enabled, such as the trigger file being determined as not present and/or information in the second file indicating a disabled state, the computing device proceeds to step 208 and boots an internal operating system (OS) of the computing device and/or an OS as directed by an associated boot module. Alternately, if dynamic redirection booting is determined as enabled, such as through the trigger file being present and/or the information in the second file indicating an enabled state, then the computing device proceeds to step 210.

Step 210 determines whether there is another bootable storage device present, such as a portable storage device containing a bootable operating system. This step can be performed in any suitable way. For example, firmware can be configured to query supported bus types for attached devices, and wait for device responses. In some embodiments, the firmware can be configured to first determine a preset boot order (such as USB first, then hard disk, etc.), enumerate all devices on the first classification (in the above case, USB), then scan for the presence of a partition record and/or active partition (e.g. a bootable partition). If another other bootable storage device determined not to be present, the computing device proceeds to step 208. Alternately, if another bootable storage device is determined to be present, in one or more embodiments, the computing device proceeds to step 212.

Step 212 determines whether the bootable storage device is on an allowed list. For example, in some embodiments, the computing device can process a file and/or list that includes information associated with bootable storage devices that the computing device is allowed to boot from and, in some embodiments, information associated with bootable storage devices that the computing device is not allowed to boot from. If the bootable storage device is determined to not be an allowable bootable storage device, the computing device proceeds to step 208. Alternately, if the bootable storage device is determine to be an allowable storage device and/or is included on the allowed list, the computing device proceeds to step 214. Any suitable way of determining an allowable storage device can be utilized, such as through a list comprising information identifying one or more allowable devices, a list comprising information identifying one or more disallowed devices, or any combination thereof. In some embodiments, a user can edit and/or manage the list of allowable and/or disallowed devices.

Step 214 transfers control to a master boot record associated with the bootable storage device. For example, control can be transferred from the volume boot sector to the master boot record associated with an OS stored on the bootable storage device. Responsive to control being transferred to the master boot record associated with the bootable storage device, step 216 boots a portable OS stored on the bootable storage device.

Figure 3:
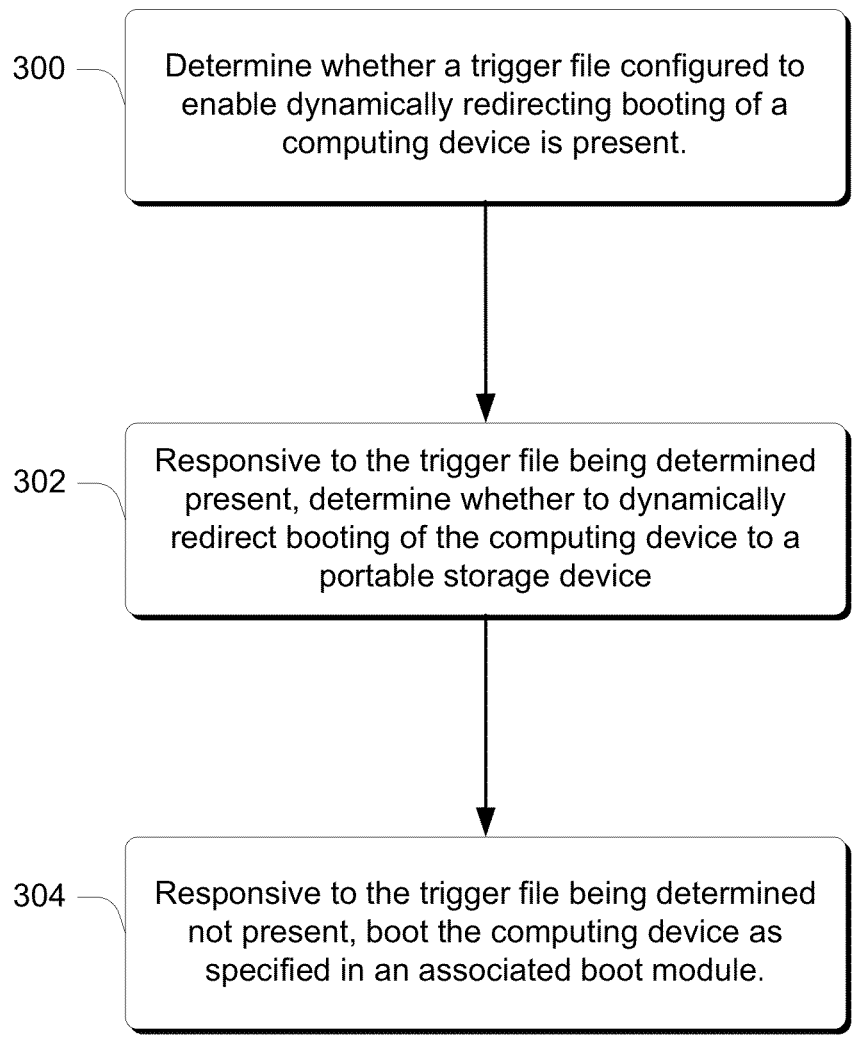
FIG. 3 is a flow diagram that describes steps in a method in accordance with one or more embodiments.

Consider FIG. 3, which is a flow diagram that describes steps in a method in accordance with one or more embodiments. The method can be performed by any suitable hardware, software, firmware, or combination thereof. In at least some embodiments, aspects of the method are performed by suitably configured software executing on a computing device such as boot redirection module 112 of FIG. 1.

Step 300 determines whether a trigger file configured to enable dynamically redirecting booting of a computing device is present. Responsive to the trigger file being determined as present, step 302 determines whether to dynamically redirect booting of the computing device to a portable storage device. This can be determined in any suitable way, examples of which are provided above. In some embodiments, this can be based upon the presence of the portable storage device, based upon whether dynamic boot redirection is enabled/disabled, whether a bootable operating system is present upon the portable storage device, whether the portable storage device is determined to be an allowed device, or any combination thereof.

Responsive to the trigger file being determined not present, step 304 boots the computing device as specified in an associated boot module, such as by booting a linear booting sequence programmed in an associated BIOS, as discussed above.

Having considered legacy booting support in accordance with one or more embodiments, consider now a discussion of dynamic boot redirection in the context of a Unified Extensible Firmware Interface in accordance with one or more embodiment.

Unified Extensible Firmware Interface (UEFI) Booting

When a BIOS is used to boot a computing device, the BIOS typically performs its initialization and relinquishes control of the computing device to a master boot record. Upon transfer of control to the master boot record, code, data, and settings residing in the BIOS are no longer directly accessible. An alternative method to booting a computing device utilizes a Unified Extensible Firmware Interface (UEFI). In a UEFI system, platform firmware that boots and loads an operating system on the computing device can include certain elements that are continually accessible, even after the boot process, such as "runtime services". Applications can access the firmware's boot device priority configuration through these UEFI "runtime services" to modify the behavior and/or configuration of the computing device. In some embodiments, this can include dynamically redirecting booting of the computing device without a user manually accessing the firmware at boot time in order to reconfigure a linear boot order of the computing device. Alternately or additionally, this can include adding a generic and/or specific boot entry associated with a portable storage device to enable a modified boot order.

A UEFI system can maintain a list of boot entries within the platform firmware. These boot entries can be configured to instruct the firmware to boot a particular order of devices until a bootable device is found. For instance, consider a list of boot entries containing an order specified as follows: (1) hard disk one, (2) hard disk two, (3) Digital Versatile Disk (DVD) drive, (4) USB drive, and (5) network drive. With this particular list, the computing device would first attempt to boot from hard disk one. If a bootable drive is found on hard disk one, the computing device boots ceases to look any further and boots from hard disk one. If a bootable drive is not found, then the computing device proceeds to hard disk two. The process repeats through the list until either a bootable drive is found or no more entries are found. In some embodiments, runtime services can be used to modify and/or alter the list of boot entries. For example, through the runtime services, boot entry USB drive can be moved from position (4) to position (1). In this particular case, when the computing device reboots, it will search for a USB device as first priority to boot from. If a USB device with a bootable disk is detected as present, the computing device will boot accordingly. If the USB device is not detected as present, the computing device will move to the next device in the list of boot entries.

In some embodiments, a boot redirection application can be placed in the list of boot entries and, in some cases, can be placed in the highest priority position. For example, the runtime services can be used to alter the list of boot entries to add an application, in addition to, and/or in lieu of, boot devices. As in the case above, the position of the boot redirection application in the list can determine the priority in which it is run. If the boot redirection application is placed at the top of the list, when the computing device boots, the firmware would first attempt to transfer control to the application. The application can be configured in any suitable way, examples of which are provided below. For example, the application can be configured to dynamically redirect booting of the computing device to a portable storage device when the portable storage device is detected as being present.

Figure 4:
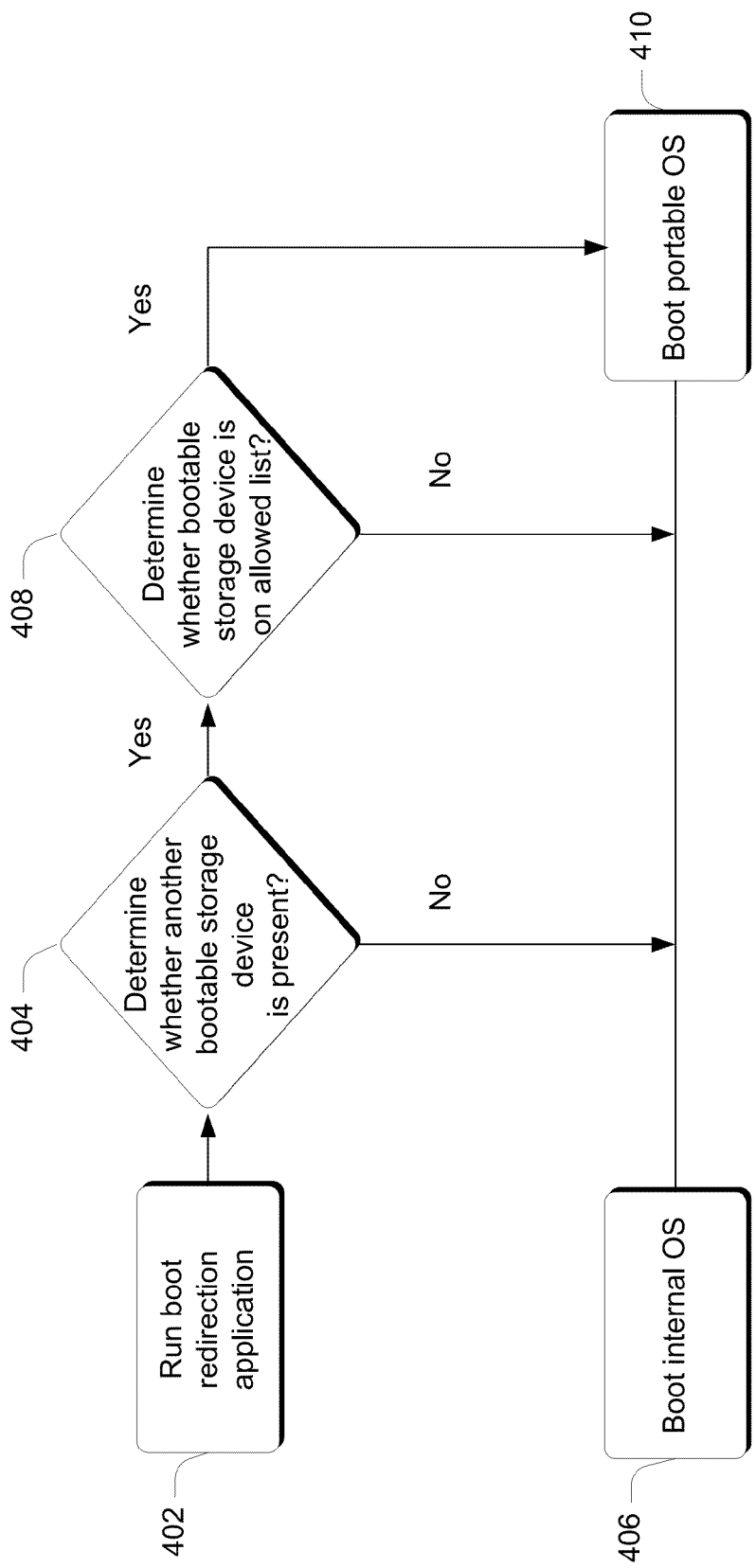
FIG. 4 is a flow diagram that describes steps in a method in accordance with one or more embodiments.

As an example, consider FIG. 4, which illustrates a flow diagram that describes steps in a method in accordance with one or more embodiments. In particular, FIG. 4 illustrates one example of dynamic boot redirection that utilizes platform firmware configured as being accessible via UEFI. This method can be performed in any suitable hardware, software, firmware, or any combination thereof. In some embodiments, portions of the method can be implemented to run on computing device 102 of FIG. 1.

Step 402 runs a boot redirection application. As a computing device boots via platform firmware associated with UEFI, the boot process can include running one or more applications, such as a boot redirection application residing on an internal OS system partition of the computing device. In some embodiments, the boot redirection application can be inserted in a list of boot entries and, in some cases, at the top and/or highest priority entry such that during the boot process, control is passed to the boot redirection application first. The boot redirection application includes functionality associated with dynamically redirecting how a computing device boots, such as identifying the presence of a portable storage device, modifying platform firmware via the UEFI interface, and the like. In some embodiments, the boot redirection application includes an ability to enable and disable dynamic boot redirection. While executing the boot redirection application, the computing device proceeds to step 404.

Step 404 determines whether another bootable storage device is present, such as a portable storage device including a bootable OS as described above. If no bootable storage device is determined as being present, the computing device proceeds to step 406 and boots an internal OS on the computing device as directed by its boot redirection application and/or boot module. However, if a bootable storage device is determined as being present, the computing device proceeds to step 408.

Step 408 determines whether the bootable storage device is on an allowed list. This can be achieved in any suitable way, examples of which are provided above. If it is determined the bootable storage device is not an allowed bootable storage device, the computing device proceeds to step 406. If it is determined the bootable storage device is an allowed bootable storage device, the computing device proceeds to step 410

Step 410 boots a portable OS that is stored on the bootable storage device. This can be achieved in any suitable manner, such as through programmatically issuing commands to the platform firmware via the UEFI. In some embodiments, a boot entry associated with the bootable storage device can be inserted into the platform firmware effective to direct the platform firmware to boot the bootable storage device. For example, if the bootable storage device is a portable USB storage device type, a generic USB class entry can be added to the platform firmware to redirect booting of the computing device to the USB storage device. In this manner, the computing device can be dynamically redirected to a boot from the bootable storage device without a user manually modifying an associated boot module.

Figure 5:
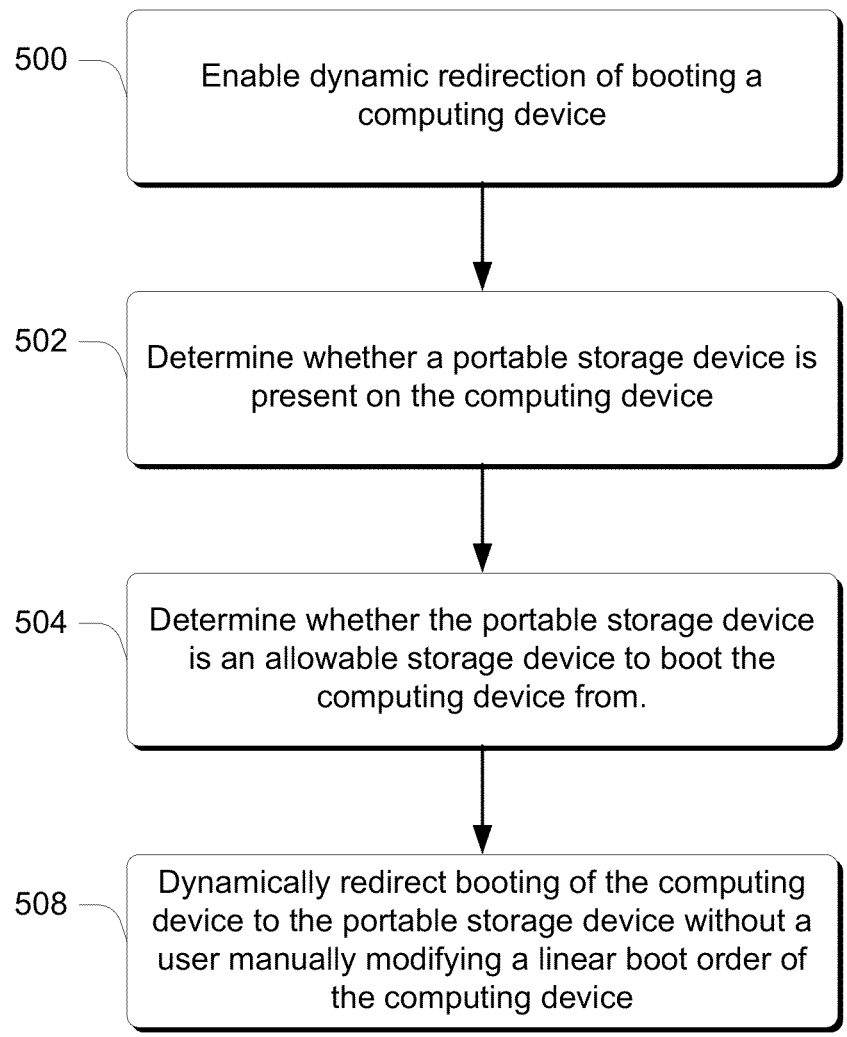
FIG. 5 is a flow diagram that describes steps in a method in accordance with one or more embodiments

Consider now FIG. 5, which illustrates a flow diagram that describes steps in a method in accordance with one or more embodiments. The method can be performed by any suitable hardware, software, firmware, or combination thereof. In at least some embodiments, aspects of the method are performed by suitably configured software executing on a computing device, such as boot redirection module 112 of FIG. 1.

Step 500 enables dynamic redirection of booting a computing device. As described above, dynamic redirection of booting the computing device can be enabled and/or disabled. For example, this step can be performed by receiving an enable/disable setting value through a connection external to the computing device, such as through an administrator pushing the enable/disable setting onto the computing device.

Step 502 determines whether a portable storage device is present on the computing device. This includes determining whether the portable storage device is attached to, and/or in communication with, the computing device, examples of which are provided above. Alternately or additionally, this includes determining whether a bootable operating system resides on the portable storage device.

Step 504 determines whether the portable storage device is an allowable storage device from which to boot the computing device. Any suitable way of determining an allowable storage device can be utilized, examples of which are provided above.

Responsive to determining the portable storage device is an allowable storage device to boot the computing device from, step 508 dynamically redirects booting of the computing device to the portable storage device without a user manually modifying a linear boot order of the computing device. For example, the computing device can be dynamically redirected without user manually programming a linear order of devices in a boot module associated with the computing device. In some embodiments, software can automatically add a boot device to the boot order of the computing device, based upon the presence of the boot device.

Having discussed supporting dynamically redirecting booting of a computing device in a UEFI environment, consider now a discussion of an example system in accordance with one or more embodiments.

Example System

Figure 6:
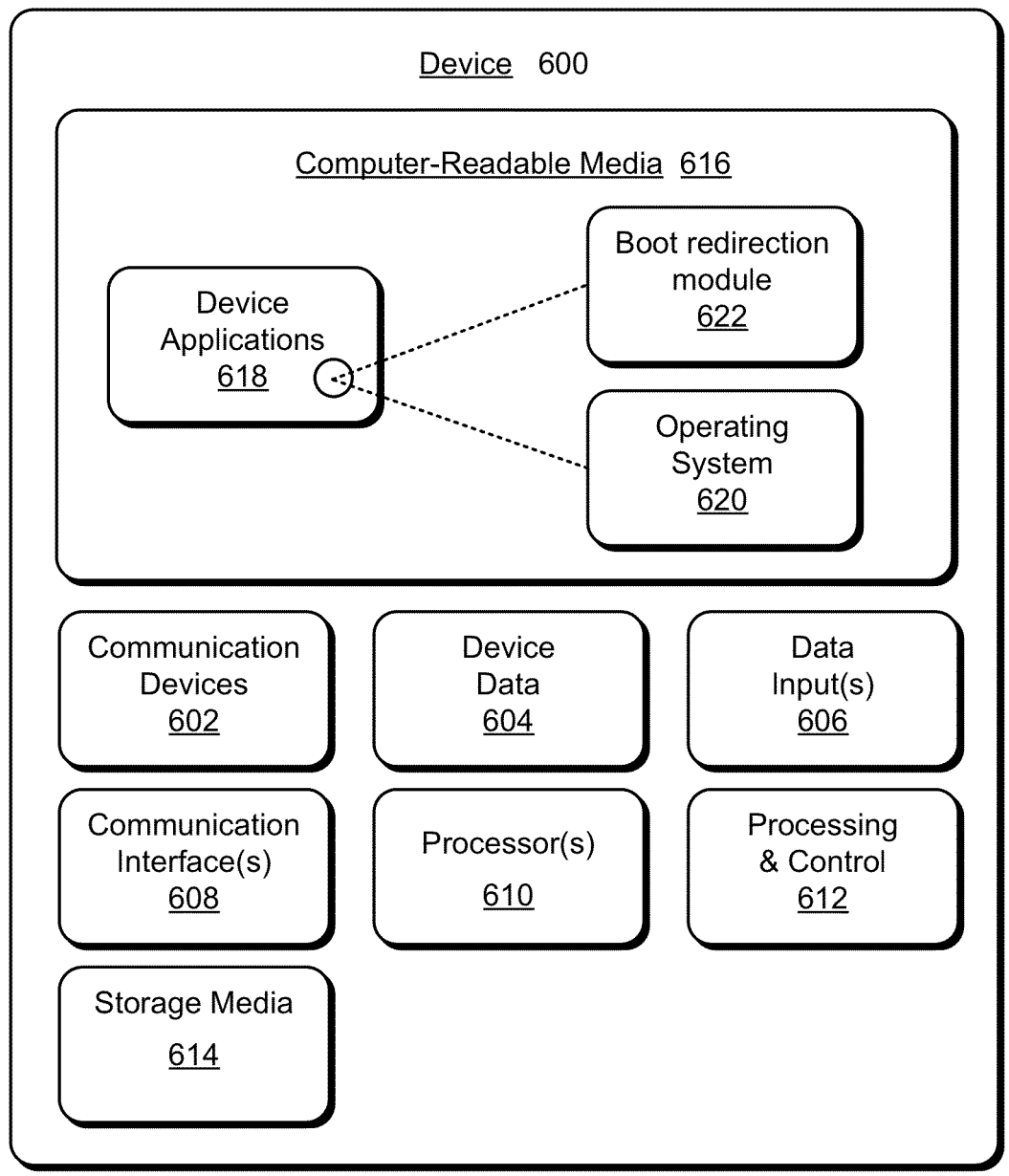
FIG. 6 illustrates an example system that can be utilized to implement one or more embodiments.

FIG. 6 illustrates various components of an example device 600 that can be implemented as any type portable and/or computer device as described above with reference to device 102 in FIG. 1.

Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source. User-selectable inputs include one or more input mechanisms by which a user can interact with the device. A user-selectable input mechanism can be implemented in any suitable way, such as a keyboard, a button, a stylus, a touch screen, a mouse, voice input, and the like.

Device 600 also include communication interface(s) 608 that can be implemented as any one or more of a serial and/or parallel interface, a wireless interface, any type of network interface, a modem, and as any other type of communication interface. The communication interface(s) 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable or readable instructions to control the operation of device 600 and to implement the dynamic redirection of booting a computing device as described above. Alternatively or additionally, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also include computer-readable storage media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like.

Computer-readable media 616 provides data storage mechanisms to store the device data 604, as well as various device applications 618 and any other types of information and/or data related to operational aspects of device 600. For example, an operating system 620 can be maintained as a computer application with the computer-readable media 616 and executed on processor(s) 610. The device applications 618 can include a device manager (e.g., a control application, software application, signal processing and control module, code that is native to a particular device, a hardware abstraction layer for a particular device, etc.). The device applications 618 also include any system components or modules utilized to implement embodiments of dynamic redirection of booting a computing device as described herein.

With respect to device 600, the device applications 618 include boot redirection module 622 that can be configured to dynamically redirect booting of device 600 as described above. Although boot redirection module 622 is shown as a software module and/or computer application, such can be implemented as hardware, software, firmware, or any combination thereof.

Conclusion

Various embodiments provide an ability to automatically boot a computing device with an operating system stored on a portable storage device when the portable storage device is detected to be present. The computing device can be configured to dynamically boot from the portable storage device when the portable storage device is detected, and revert to a programmed boot order in its associated boot module when the portable storage device is not detected. In some embodiments, the operating system is fully encapsulated on the portable storage device, such as the operating system being completely separate from an operating system initially booting the computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
enabling, by a computing device, dynamic redirection of booting of the computing device;
determining, by the computing device, whether a portable storage device is present on the computing device;
responsive to determining the portable storage device is present, determining, by the computing device, whether the portable storage device is an allowable storage device from which to boot the computing device; and
responsive to determining the portable storage device is an allowable storage device, dynamically redirecting, by the computing device, booting of the computing device to an operating system stored on the portable storage device without manual modifications to a boot module that includes a programmed linear boot order, the dynamically redirecting booting of the computing device comprising programmatically issuing commands to the computing device's platform firmware effective to add a boot entry associated with the portable storage device.

2. The computer-implemented method of claim 1, the computing device's platform firmware configured to be accessible via a Unified Extensible Firmware Interface (UEFI).

3. The computer-implemented method of claim 1, the portable storage device differing from storage devices specified in the programmed linear boot order of the computing device's boot module.

4. The computer-implemented method of claim 1, the operating system stored on the portable storage device being fully encapsulated on the portable storage device.

5. The computer-implemented method of claim 1, the determining whether the portable storage device is an allowable storage device comprising processing a list including information identifying one or more allowable devices.

6. The computer-implemented method of claim 1, the enabling dynamic redirection of booting comprising receiving an enable/disable setting value through an external connection.

7. A computing device comprising:
one or more processors;
one or more computer-readable storage media, the computer readable storage media comprising instructions executable by the one or more processors to implement operations comprising:
determining whether a portable storage device is connected with a computing device;
responsive to determining the portable device is connected with the computing device, determining whether the portable storage device contains a bootable operating system; and
responsive, at least in part, to determining the portable storage device contains a bootable operating system, dynamically redirecting booting of the computing device to the bootable operating system contained on the portable storage device, dynamic boot redirection redirecting booting of the computing device from a linear boot order programmed in an associated boot module without manual intervention, wherein the dynamically redirecting booting of the computing device comprises programmatically issuing commands to platform firmware associated with the computing device effective to add a boot entry associated with the portable storage device to the platform firmware.

8. The computing device of claim 7 further comprising allowing dynamic boot redirection to be enabled and disabled.

9. The computing device of claim 7, wherein the operating system contained on the portable storage device is fully encapsulated on the portable storage device.

10. The computing device of claim 7 further comprising:
determining whether the portable storage device is an allowable storage device; and
responsive to determining the portable storage device is not an allowable storage device, booting the computing device in the linear boot order programmed in the associated boot module.

11. A computer-implemented method comprising:
enabling, by a computing device, dynamic redirection of booting of the computing device;
determining, by the computing device, whether a portable storage device is present on the computing device;
responsive to determining the portable storage device is present, determining, by the computing device, whether the portable storage device is an allowable storage device from which to boot the computing device, the determining whether the portable storage device is an allowable storage device comprising processing a list including information identifying one or more allowable devices; and
responsive to determining the portable storage device is an allowable storage device, dynamically redirecting, by the computing device, booting of the computing device to an operating system stored on the portable storage device without manual modifications to a boot module that includes a programmed linear boot order.

12. The computer-implemented method of claim 11, the computing device's platform firmware configured to be accessible via a Unified Extensible Firmware Interface (UEFI).

13. The computer-implemented method of claim 11, the portable storage device differing from storage devices specified in the programmed linear boot order of the computing device's boot module.

14. The computer-implemented method of claim 11, the operating system stored on the portable storage device being fully encapsulated on the portable storage device.

15. The computer-implemented method of claim 11, the determining whether the portable storage device is an allowable storage device comprising processing a list including information identifying one or more allowable devices.

16. The computer-implemented method of claim 11, the enabling dynamic redirection of booting comprising receiving an enable/disable setting value through an external connection.

17. A computing device comprising:
one or more processors;
one or more computer-readable storage media, the computer readable storage media comprising instructions executable by the one or more processors to implement operations comprising:
enabling, by a computing device, dynamic redirection of booting of the computing device;
determining, by the computing device, whether a portable storage device is present on the computing device;
responsive to determining the portable storage device is present, determining, by the computing device, whether the portable storage device is an allowable storage device from which to boot the computing device, the determining whether the portable storage device is an allowable storage device comprising processing a list including information identifying one or more allowable devices; and
responsive to determining the portable storage device is an allowable storage device, dynamically redirecting, by the computing device, booting of the computing device to an operating system stored on the portable storage device without manual modifications to a boot module that includes a programmed linear boot order.

* * * * *